May 9, 1967 G. F. SIEDOW 3,318,325

DUAL CHAMBERED TIRE VALVE

Filed May 13, 1963

United States Patent Office 3,318,325
Patented May 9, 1967

3,318,325
DUAL CHAMBERED TIRE VALVE

George F. Siedow, Akron, Ohio, assignor to The Firestone Tire & Rubber Company, Akron, Ohio, a corporation of Ohio Filed May 13, 1963, Ser. No. 279,979
4 Claims. (Cl. 137—234.5)

This invention relates to valves and more particularly to valves for dual chambered pneumatic tires.

In tubeless tires having safety members therein to define dual chambers, inflation, maintenance of uniform air pressures in both chambers and retention of air pressure within the inner chamber, in the event of tire failure, have been problems. Numerous types of valves have been tried without success.

This invention provides, a single valve for inflation of both chambers simultaneously with conventional inflating means, sealing means between passages in the valve to isolate the chambers upon inflation of the tire and to maintain isolation in the event of tire failure.

It is, therefore, an object of this invention to provide an improved valve for dual chamber compartmentation.

Another object is to provide a valve for inflating dual chambers simultaneously.

Another object is to provide a valve having means to provide communication between dual chambers during inflation thereof, to interrupt communication upon inflation thereof, and to maintain interruption between the chambers.

Another object is to provide a valve that permits inflation, deflation or gauging of dual chambers simultaneously.

Another object is to provide a valve for dual chambers that permits the use of conventional inflating devices.

Another object is to provide a single, inexpensive and simple valve for dual compartment tires which utilizes a single, longitudinally sliding, passage-blocking seal, in conjunction with a single radial seal.

These and other objects will be more apparent after reference to the following specification and drawing in which.

Figure 1:
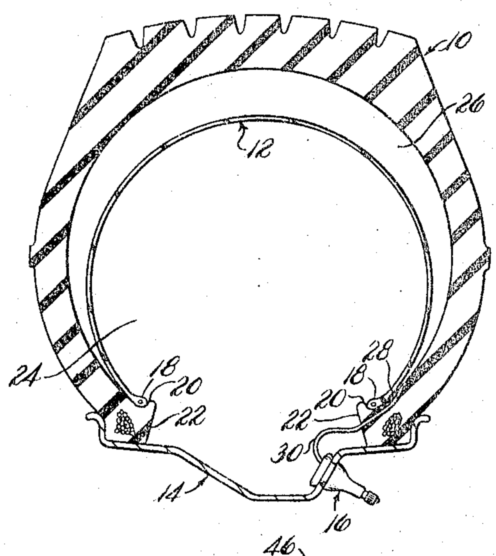
FIGURE 1 is a radial sectional view of a tire, safety member, and rim assembly incorporating the valve of the invention, the valve being constructed as a "snap in" type valve.

Referring to FIGURE 1 of the drawing, a tire 10 having a safety member 12 is shown mounted on a rim 14 having a valve 16 constructed in accordance with the invention. The safety member shown in FIGURE 1 is of the type having a pair of annular beads 18 which are adapted to seat on appropriate ledges 20 formed on the tire bead portions 22, 22 of the tire 10. Thus, is formed an inside chamber 24 by the safety member 12, tire bead portions 22, 22 and rim 14 and an outer chamber 26 by the safety member 12 and the inner periphery of the tire 10. A passage 28 through one of the bead portions 22 communicates between the outer chamber 26 and the valve 16 by a small hose 30.

Figure 2:
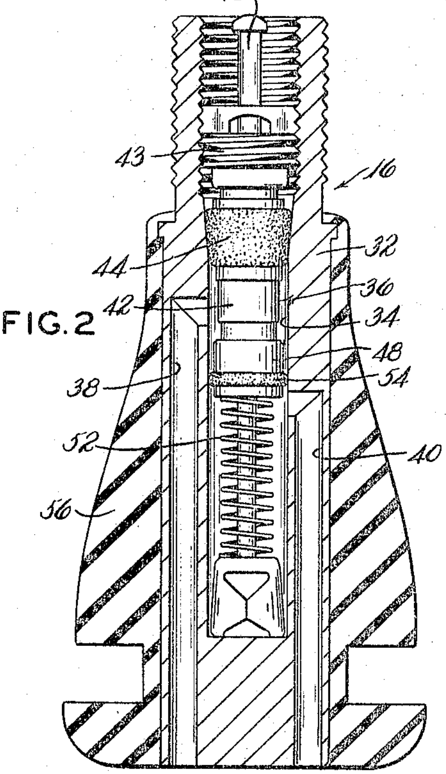
FIGURE 2 is a longitudinal sectional view of the valve of FIGURE 1 the components being shown in normal operating position.

The valve 16 as shown in FIGURE 2 comprises a body portion 32 having a central axially extending bore defined by wall 34 closed at its inner end and threaded at its open end and adapted to receive a valve core 36. Spaced radially outwardly from bore wall 34 are axially extending passages 38 and 40 each communicating with the bore at axially spaced points on its wall 34. The passage 40 connects to outer chamber 26 by conduit means 30 and the passage 38 connects with inner chamber 24.

The valve core 36 comprises a body portion 42 having a threaded portion 43, a sealing ring 44, a plunger 46 extending through the body portion 42, a seat or closure member 48 on the plunger 46 having a sealing member 50 with a substantially radial face normally biased against the axially inner end of body portion 42 by a spring 52. Seat 48 is provided with an annular O-ring or gasket 54 around its outer periphery and adapted to slide longitudinally, or axially, on the wall 34. In the normal operating position as seen in FIGURE 2, the axially extending sealing face of O-ring 54 engages the bore wall 34 between the points of entry of passages 38 and 40 into the bore. A resilient body 56 may be molded around the valve body portion 32 to provide a "snap-in" type of valve.

Figure 3:
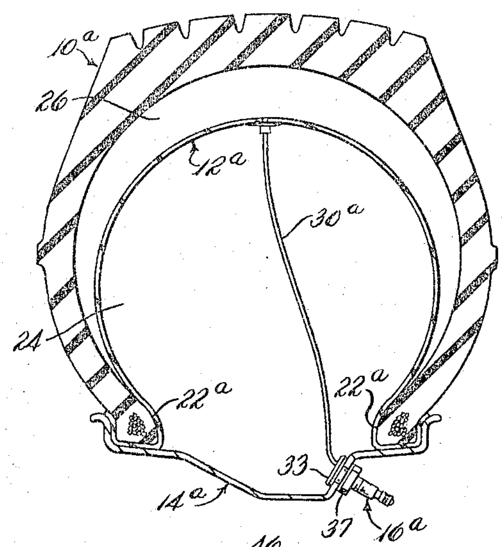
FIGURE 3 is a view similar to FIGURE 1 but showing another type of tire, safety member and rim assembly incorporating a modified valve of the invention.

FIGURE 3 illustrates a modified form of the invention in which a tire **10*a* has a safety member 12*a* anchored between the tire bead portions 22*a* and a rim 14*a* to form an outer chamber 26 between the safety member and the tire and an inner chamber 24 between the safety member and the rim 14*a*. Valve 16*a* in rim 14*a* is identical to valve 16, with the exception that body portion 32*a* is provided with a head 33 and threads 35 receiving a lock nut 37 to secure the valve to the rim, in place of the molded resilient body portion 56**.

Figure 4:
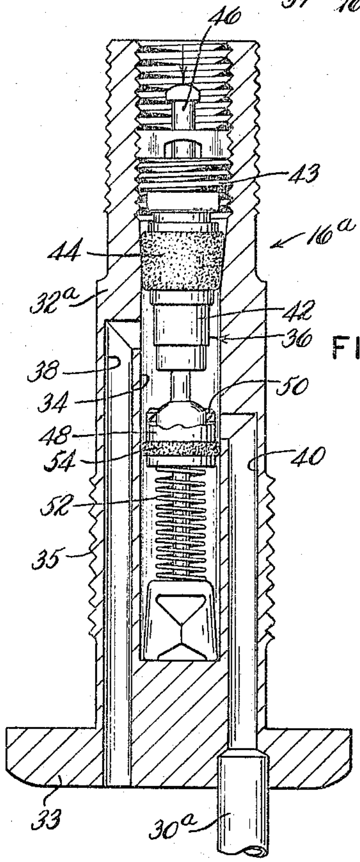
FIGURE 4 is a longitudinal sectional view of the valve of FIGURE 3, the components being shown in inflate-deflate position.

The valve core 36 as shown in FIGURE 4 is in the inflate/deflate/gauge position, in which plunger 46 has displaced seat 48 with sealing member 50 and sliding O-ring 54. With the plunger 46 thus depressed, the O-ring 54 is moved axially past the entry of passage 40, and sealing member 50 is moved axially from body portion 42, providing open communication between the bore and passages 38 and 40. Thus, when the plunger 46 is depressed, communication between chambers 24 and 26 is provided through the passages 38 and 40 and the bore to permit uniform, simultaneous inflation, deflation or gauging of both chambers.

When the plunger 46 is released, the O-ring moves back to its normal position, as seen in FIGURE 3, to isolate the passages 38 and 40, and thus chambers 24 and 26, from each other, and sealing gasket 50 again closes the bore to the outside.

In the event of failure of tire 10 or **10*a*, due to puncture or blowout, with attendant air escape from chamber 26, no inflationary air will escape from the chamber 24 due to the isolation provided by the longitudinally moveable sealing ring 54** of the novel valve construction, thus permitting the driver of the vehicle to stop safely without losing control of the vehicle.

The valve of the invention provides a simple, yet effective valve for dual chambers, which permits uniform, simultaneous inflation, deflation or gauging of the chambers by the use of readily available conventional equipment, and which permits complete isolation of the outer and inner chambers from each other during operation, thereby providing a safer, accurately inflated vehicle tire.

While the valve of the invention has been shown and described in conjunction with a vehicle tire it is obvious that the valve may be used with any dual chambered container and various modifications will occur to those skilled in the art without departing from the scope of the invention as defined in the appended claims.

What is claimed is:

1. A unitary valve for a dual air-chamber, comprising a body having a bore with an open outer end and an inner end, passages in said body for communicating the bore with each of two air-chambers, a valve core, having a closure mounted thereon, located in said bore and separating the outer and inner ends thereof and having a passageway therethrough terminating adjacent said passages at its inner end, a first positive sealing member on said closure comprising a gasket axially slideably engaging said bore and normally isolating said passages from each other, a second sealing member on said closure normally isolating at least one of said passages from said inner end of said passageway, and means for moving said first and second sealing members simultaneously to connect said passages with each other and with said open outer end.

2. A valve as in claim 1, wherein said passages terminate at axially spaced locations in said bore.

3. A valve as in claim 1, and resilient means at the inner end of said closure and urging said closure axially outwardly.

4. A valve as in claim 3, in which said resilient means comprises a spring.

References Cited by the Examiner

UNITED STATES PATENTS

| | | | |
|---|---|---|---|
| 2,189,485 | 2/1940 | Crowley | 137—223 X |
| 2,272,548 | 2/1942 | Creamer | 277—20 |
| 3,191,654 | 6/1965 | Anderson | 152—341 |

WILLIAM F. O'DEA, *Primary Examiner.*

ISADOR WEIL, D. H. LAMBERT, *Assistant Examiners.*